US010719563B2

(12) United States Patent
Tenenblat et al.

(10) Patent No.: US 10,719,563 B2
(45) Date of Patent: *Jul. 21, 2020

(54) METHOD AND SYSTEM FOR PROVIDING INFORMATION TO A MOBILE HANDHELD DEVICE FROM A DATABASE SYSTEM

(71) Applicant: salesforce.com, inc., San Francisco, CA (US)

(72) Inventors: Leo Tenenblat, Hillsborough, CA (US); Marko Koosel, San Francisco, CA (US); Thomas Sola, San Francisco, CA (US); Siuling Ku, Alameda, CA (US); Andrew Tran, San Francisco, CA (US); Ning Song, Redwood City, CA (US); Doug Chasman, Pittsford, NY (US)

(73) Assignee: salesforce.com, inc., San Francisco, CA (US)

( * ) Notice: Subject to any disclaimer, the term of this patent is extended or adjusted under 35 U.S.C. 154(b) by 487 days.

This patent is subject to a terminal disclaimer.

(21) Appl. No.: 15/290,360

(22) Filed: Oct. 11, 2016

(65) Prior Publication Data
US 2017/0053030 A1    Feb. 23, 2017

Related U.S. Application Data

(63) Continuation of application No. 13/212,006, filed on Aug. 17, 2011, now Pat. No. 9,465,885.
(Continued)

(51) Int. Cl.
*G06F 15/173* (2006.01)
*G06F 16/951* (2019.01)
(Continued)

(52) U.S. Cl.
CPC ...... *G06F 16/951* (2019.01); *G06F 16/24578* (2019.01); *G06F 16/957* (2019.01); *H04L 41/0816* (2013.01); *H04L 43/0847* (2013.01)

(58) Field of Classification Search
USPC .......................................... 709/217
See application file for complete search history.

(56) References Cited

U.S. PATENT DOCUMENTS 5,577,188 A    11/1996 Zhu
5,592,620 A *   1/1997 Chen .................. H04L 41/0213
                                        707/999.01
(Continued)

OTHER PUBLICATIONS

U.S. Appl. No. 13/986,251, filed Apr. 16, 2013.
(Continued)

*Primary Examiner* — Alicia Baturay
(74) *Attorney, Agent, or Firm* — Dergosits & Noah LLP; Todd A. Noah

(57) ABSTRACT

A method for providing information to a mobile handheld device from a database system is provided. The method embodiment includes receiving by a node hosting an information management service a request for data. The request is received from a network enabled mobile handheld device that has intermittent network connectivity. The information management service is configured for identifying unrequested anticipated data based on the requested data. In an embodiment, the anticipated data is identified based on a data request pattern associated with the requested data. Once identified, the requested data and the anticipated data is retrieved from a database system. The requested data and at least a portion of the anticipated data is sent to the network enabled mobile handheld device via a network. By providing anticipated data along with requested data, a mobile user has direct access to unrequested anticipated data when network connectivity is interrupted.

9 Claims, 10 Drawing Sheets

Related U.S. Application Data

(60) Provisional application No. 61/419,677, filed on Dec. 3, 2010.

(51) Int. Cl.
  *G06F 16/957*    (2019.01)
  *G06F 16/2457*    (2019.01)
  *H04L 12/24*    (2006.01)
  *H04L 12/26*    (2006.01)

(56) References Cited

U.S. PATENT DOCUMENTS

| | | | |
|---|---|---|---|
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,864,854 A * | 1/1999 | Boyle | G06F 12/0813 |
| 5,873,096 A | 2/1999 | Lim et al. | |
| 5,878,223 A * | 3/1999 | Becker | G06F 16/9574 |
| | | | 709/223 |
| 5,918,159 A | 6/1999 | Fomukong et al. | |
| 5,954,801 A * | 9/1999 | Sokolov | G06F 3/0676 |
| | | | 710/5 |
| 5,958,040 A * | 9/1999 | Jouppi | G06F 9/3802 |
| | | | 711/122 |
| 5,963,953 A | 10/1999 | Cram et al. | |
| 5,999,948 A * | 12/1999 | Nelson | H04L 41/0213 |
| | | | 715/207 |
| 6,067,565 A * | 5/2000 | Horvitz | H04L 29/06 |
| | | | 709/218 |
| 6,076,107 A * | 6/2000 | Chen | H04L 41/0213 |
| | | | 709/202 |
| 6,085,226 A * | 7/2000 | Horvitz | G06F 16/9574 |
| | | | 709/203 |
| 6,092,083 A | 7/2000 | Brodersen et al. | |
| 6,092,149 A * | 7/2000 | Hicken | G06F 3/0676 |
| | | | 711/112 |
| 6,094,680 A * | 7/2000 | Hokanson | H04N 7/17336 |
| | | | 348/E7.073 |
| 6,105,061 A * | 8/2000 | Nakai | H04L 41/044 |
| | | | 709/223 |
| 6,115,768 A * | 9/2000 | Yamamoto | G06F 13/1615 |
| | | | 710/107 |
| 6,151,630 A * | 11/2000 | Williams | G06F 16/957 |
| | | | 709/229 |
| 6,161,149 A | 12/2000 | Achacoso et al. | |
| 6,167,438 A * | 12/2000 | Yates | H04L 29/06 |
| | | | 709/216 |
| 6,169,534 B1 | 1/2001 | Raffel et al. | |
| 6,178,425 B1 | 1/2001 | Brodersen et al. | |
| 6,182,122 B1 * | 1/2001 | Berstis | H04L 12/1859 |
| | | | 709/217 |
| 6,182,133 B1 * | 1/2001 | Horvitz | G06F 16/9574 |
| | | | 709/223 |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,260,115 B1 * | 7/2001 | Permut | G06F 12/0862 |
| | | | 711/133 |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,385,641 B1 * | 5/2002 | Jiang | H04L 29/06 |
| | | | 709/203 |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,438,652 B1 * | 8/2002 | Jordan | G06F 9/505 |
| | | | 711/120 |
| 6,442,651 B2 * | 8/2002 | Crow | G06F 16/9574 |
| | | | 711/118 |
| 6,446,089 B1 | 9/2002 | Brodersen et al. | |
| 6,484,239 B1 * | 11/2002 | Hill | G06F 9/383 |
| | | | 711/137 |
| 6,510,469 B1 * | 1/2003 | Starnes | G06K 9/222 |
| | | | 709/247 |
| 6,535,909 B1 | 3/2003 | Rust | |
| 6,539,382 B1 * | 3/2003 | Byrne | G06F 12/0862 |
| | | | 711/118 |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,625,696 B1 * | 9/2003 | Willke, II | G06F 12/0862 |
| | | | 711/137 |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,840 B1 * | 4/2004 | Shatil | G06F 12/0866 |
| | | | 707/999.003 |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,742,033 B1 * | 5/2004 | Smith | H04L 67/2847 |
| | | | 709/224 |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,792,507 B2 * | 9/2004 | Chiou | G06F 12/0813 |
| | | | 711/119 |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,901,380 B1 * | 5/2005 | Bremers | G06Q 30/06 |
| | | | 705/26.81 |
| 6,937,966 B1 * | 8/2005 | Hellerstein | G06Q 10/06 |
| | | | 703/2 |
| 6,981,017 B1 * | 12/2005 | Kasriel | H04L 67/2847 |
| | | | 709/203 |
| 6,985,933 B1 * | 1/2006 | Singhal | H04L 67/18 |
| | | | 709/219 |
| 7,024,491 B1 * | 4/2006 | Hanmann | G06F 16/9574 |
| | | | 709/248 |
| 7,062,502 B1 | 6/2006 | Kesler | |
| 7,062,567 B2 * | 6/2006 | Benitez | G06F 8/65 |
| | | | 709/217 |
| 7,089,331 B1 * | 8/2006 | Gollapudi | H04L 69/04 |
| | | | 709/247 |
| 7,340,411 B2 | 3/2008 | Cook | |
| 7,356,482 B2 | 4/2008 | Frankland et al. | |
| 7,359,395 B2 * | 4/2008 | Toporek | H04B 7/2126 |
| | | | 370/401 |
| 7,401,094 B1 | 7/2008 | Kesler | |
| 7,620,655 B2 | 11/2009 | Larsson | |
| 7,698,160 B2 | 4/2010 | Beaven et al. | |

(56) References Cited

U.S. PATENT DOCUMENTS

| | | | |
|---|---|---|---|
| 7,779,475 B2 | 8/2010 | Jakobson et al. | |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,041,776 B2 * | 10/2011 | Friedman | H04L 29/06 709/201 |
| 8,069,225 B2 * | 11/2011 | McCanne | H04L 41/12 706/21 |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,271,964 B2 * | 9/2012 | Zorn | G06F 8/20 717/140 |
| 8,275,836 B2 | 9/2012 | Beaven et al. | |
| 8,321,533 B2 * | 11/2012 | Fainberg | G06F 12/0862 709/219 |
| 8,364,611 B2 * | 1/2013 | Tendjoukian | H04L 67/2847 706/12 |
| 8,438,298 B2 * | 5/2013 | Arai | G06F 8/65 709/203 |
| 8,463,869 B2 * | 6/2013 | Morse | G06Q 30/02 709/217 |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,533,446 B2 * | 9/2013 | Mondri | G06F 9/485 707/705 |
| 8,566,301 B2 | 10/2013 | Rueben et al. | |
| 8,646,103 B2 | 2/2014 | Jakobson et al. | |
| 9,465,885 B2 * | 10/2016 | Tenenblat | H04L 41/0816 |
| 9,680,719 B2 * | 6/2017 | Hato | H04L 43/045 |
| 2001/0003828 A1 * | 6/2001 | Peterson | H04L 67/2847 709/219 |
| 2001/0044791 A1 | 11/2001 | Richter et al. | |
| 2001/0047456 A1 * | 11/2001 | Schrobenhauzer | G06F 9/3824 711/122 |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0288033 A1 * | 12/2006 | Raz | G06F 16/24568 |
| 2009/0063415 A1 | 3/2009 | Chatfield et al. | |
| 2009/0100342 A1 | 4/2009 | Jakobson | |
| 2009/0157985 A1 * | 6/2009 | Stevens | G06F 13/1668 711/154 |
| 2009/0177744 A1 | 7/2009 | Marlow et al. | |
| 2011/0314266 A1 * | 12/2011 | Mondri | G06F 9/485 713/2 |
| 2012/0209948 A1 * | 8/2012 | Tenenblat | H04L 41/0816 709/217 |
| 2012/0233137 A1 | 9/2012 | Jakobson et al. | |
| 2013/0054729 A1 * | 2/2013 | Jaiswal | H04L 67/2847 709/213 |
| 2013/0218948 A1 | 8/2013 | Jakobson | |
| 2013/0218949 A1 | 8/2013 | Jakobson | |
| 2013/0218966 A1 | 8/2013 | Jakobson | |
| 2014/0359537 A1 | 12/2014 | Jakobson et al. | |
| 2015/0007050 A1 | 1/2015 | Jakobson et al. | |
| 2015/0095162 A1 | 4/2015 | Jakobson et al. | |
| 2015/0172563 A1 | 6/2015 | Jakobson et al. | |

OTHER PUBLICATIONS

Office Action for U.S. Appl. No. 13/212,006; dated Jan. 15, 2014.
Office Action for U.S. Appl. No. 13/212,006; dated May 13, 2014.
Office Action for U.S. Appl. No. 13/212,006; dated Dec. 15, 2014.
Office Action for U.S. Appl. No. 13/212,006; dated Apr. 15, 2015.
Office Action for U.S. Appl. No. 13/212,006; dated Oct. 15, 2015.

* cited by examiner

METHOD AND SYSTEM FOR PROVIDING INFORMATION TO A MOBILE HANDHELD DEVICE FROM A DATABASE SYSTEM

CLAIM OF PRIORITY

This application is a continuation of U.S. application Ser. No. 13/212,006, filed Aug. 17, 2011, which claims the benefit of U.S. Provisional Patent Application 61/419,677, filed Dec. 3, 2010, both of which are incorporated herein by reference in their entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to providing information to a mobile handheld device from a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Most mobile handheld electronic devices such as tablet computers, smartphones, and personal digital assistants (PDAs) are network enabled and allow a mobile user to access information over a public network such as the Internet. For example, users can receive electronic mail (email) and web content via their smartphones and tablets. Moreover, mobile handheld devices can support mobile applications so that users can manipulate data, retrieve and send information, and save and create files. In many ways, mobile handheld devices are replacing fixed location components and bulkier laptop computers.

By their nature, mobile handheld devices establish network connectivity via a mobile wireless network, e.g., a cellular telephone network. Because wireless network connectivity relies on radio wave transmissions, depending on the location of the device, network connectivity can be weak if not altogether nonexistent. For example, in underground transit stations or in remote mountainous areas, most mobile handheld devices have little or no network capabilities. In some circumstances, network connectivity can be weak or lost in particular neighborhoods or streets. Accordingly, most mobile handheld devices inherently have intermittent network connectivity depending on the location of the device. In most situations, however, intermittent network connectivity is tolerated because many features of the mobile handheld device are not typically dependent on a sustained network connection.

In the workplace, employers often provide employees with one or more mobile handheld devices for work related purposes. In this way, employees can be outside of the corporate office and still have access to email, voice mail, and other corporate information. Nevertheless, because the device has intermittent network connectivity, accessing corporate information from a database system can be difficult or impossible. For example, a document or file retrieved from a database often includes references to, or include links to, one or more related files or documents. When the user reviews the retrieved file and wishes to review a related file or document by selecting the associated link, access to that information can be delayed when network connectivity is lost. Accordingly, the user must move to another location with network connectivity in order to retrieve the related information. In some situations, however, the user cannot move to another location; for example, when the user is attending a meeting in a room without a wireless network. In this situation, access to the related information using the mobile handheld device is effectively impossible.

Accordingly, it is desirable to provide techniques for providing information from a database system to a mobile handheld device having intermittent network connectivity.

BRIEF SUMMARY

In accordance with embodiments, there are provided mechanisms and methods for providing information to a mobile handheld device from a database system. These mechanisms and methods for providing information to a mobile handheld device can enable embodiments to provide the capability to access information related to requested information without a network connection. The ability of embodiments to provide such technique can allow a user of the mobile handheld device to access information from the database without regard to location or availability of a wireless network.

In an embodiment and by way of example, a method for providing information to a mobile handheld device from a database system is provided. The method embodiment includes receiving by a node hosting an information management service a request for data. The request is received from a network enabled mobile handheld device that has intermittent network connectivity. The information management service is configured for identifying unrequested anticipated data based on the requested data. In an embodiment, the anticipated data is identified based on a data request pattern associated with the requested data. Once identified, the requested data and at least a portion of the anticipated data is retrieved from a database system, and sent to the network enabled mobile handheld device via a network. By providing anticipated data along with requested data, a mobile user has direct access to unrequested anticipated data when network connectivity is interrupted.

In another embodiment, a method for accessing information from a database system by a mobile handheld device having intermittent network connectivity includes receiving by an information manager component hosted by a mobile handheld device a request for data, and sending the request for data to a node hosting an information management service configured for retrieving the requested data and for retrieving unrequested anticipated data from a database system. In an embodiment, the anticipated data is retrieved based on a data request pattern associated with the requested data. The requested data and at least a portion of the anticipated data is received and stored in available storage of the mobile handheld device. By providing anticipated data along with requested data, a user of the mobile handheld device has direct access to unrequested anticipated data when network connectivity is interrupted.

While one or more implementations and techniques are described with reference to an embodiment in which techniques for providing information to a mobile handheld device is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for providing information to a mobile handheld device from a database system.

In the workplace environment, employees use mobile handheld electronic devices to support many aspects of their business operations. Such devices can include, but are not limited to, tablet computers, PDAs, and smartphones, just to name a few. Typically, these devices use a wireless telecommunication infrastructure to support mobile communication services. In addition, the wireless telecommunication infrastructure can support data transmissions between network enabled mobile handheld devices and services via a public network, such as the Internet. Nevertheless, because mobile handheld devices have intermittent network connectivity, activities more suitable for using a persistent network connection are difficult and tedious for a mobile user. For example, a mobile user attempting to access multiple reports and files from a secure database system using a mobile handheld device will be required to log-in each time connectivity is reestablished after an interruption.

To date, there is no effective and/or efficient way of providing information from a database system to a mobile handheld device having intermittent network connectivity. The following exemplary embodiments illustrate mechanisms and methods that can enable a mobile user to access information from a database system using a mobile handheld device having intermittent network connectivity. The ability of embodiments to provide such technique can enhance the functionality of the device and can improve the user's productivity and efficiency.

Figure 1:
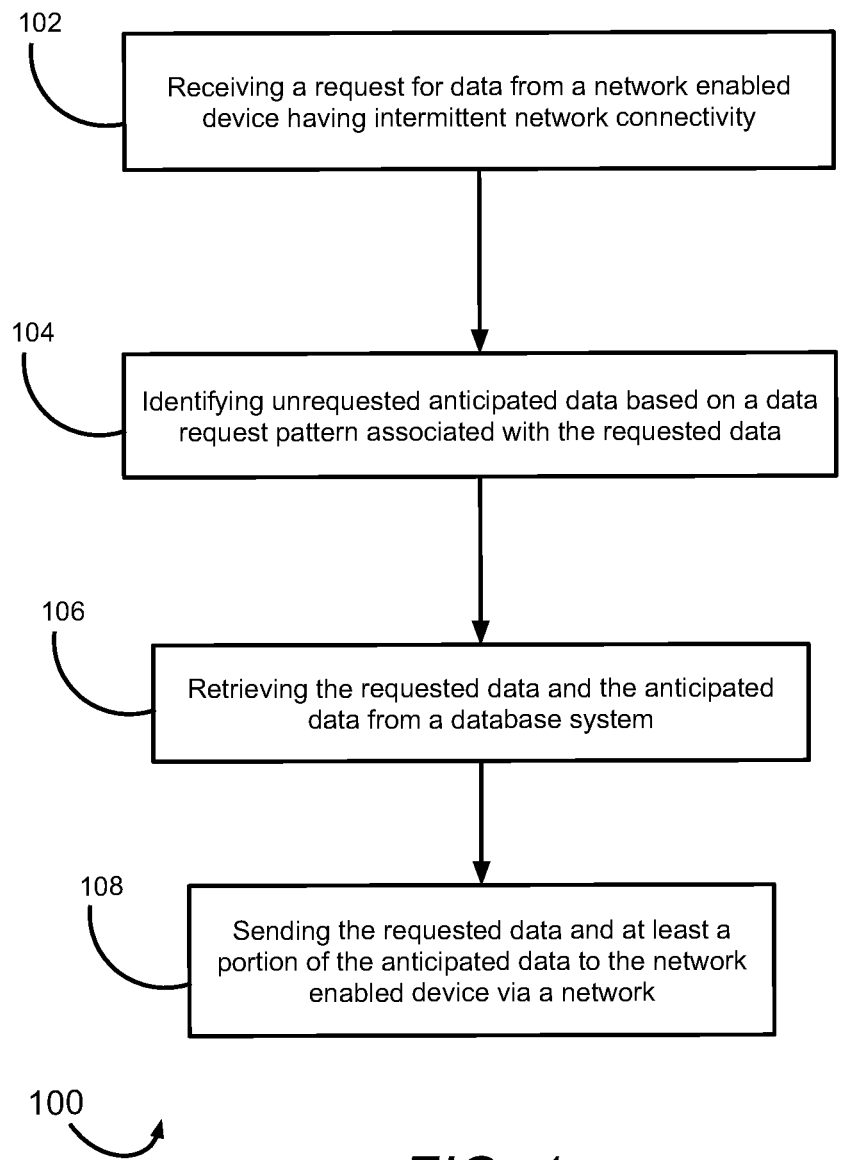
FIG. 1 is an operational flow diagram illustrating a high level overview of a technique for providing information to a mobile handheld device from a database system according to an embodiment.
Figure 2:
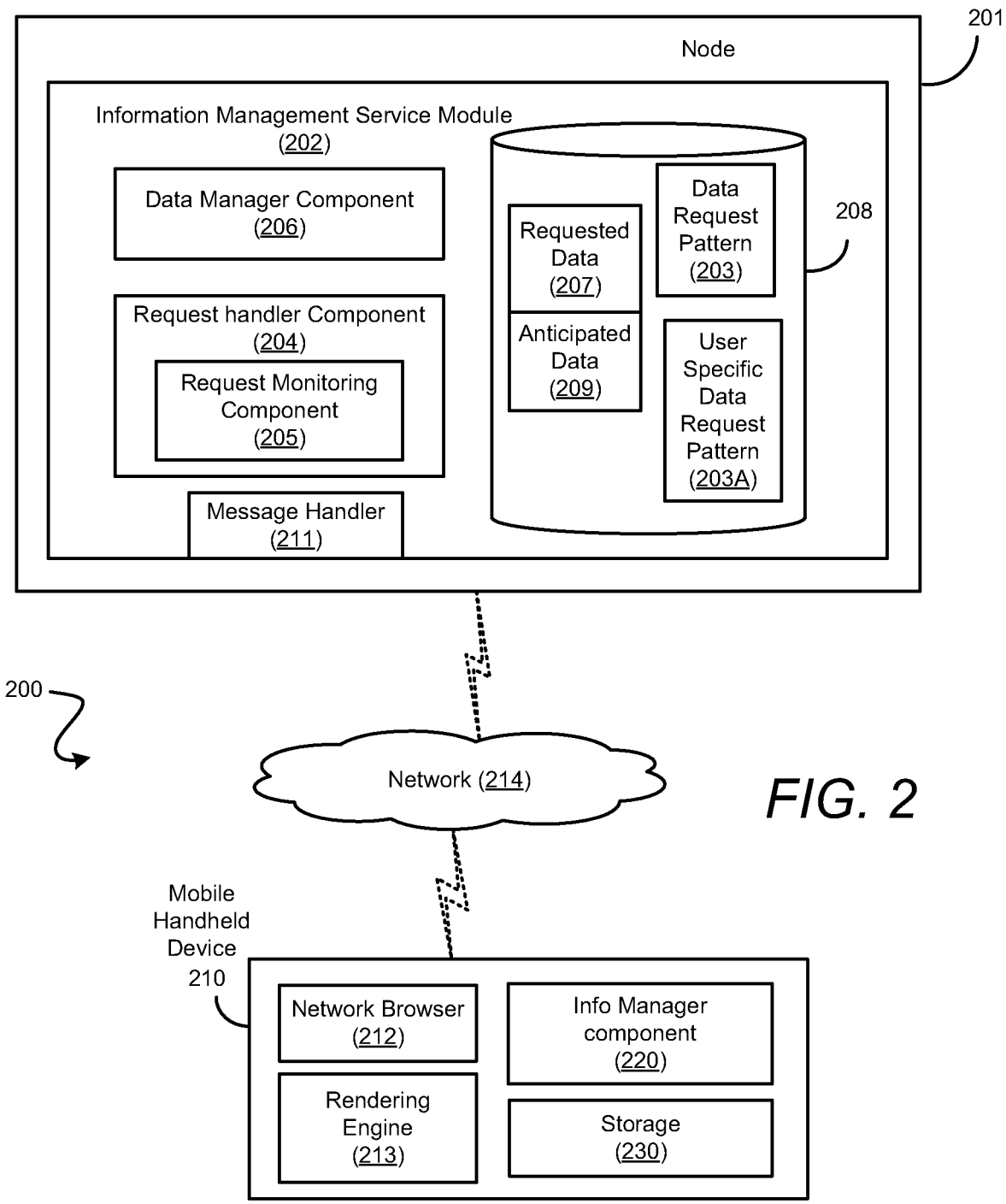
FIG. 2 illustrates a representative system for providing information to a mobile handheld device from a database system according to an embodiment.

FIG. 1 illustrates a method 100 for providing information to a mobile handheld device from a database system according to an embodiment. FIG. 2 illustrates a representative system 200 for providing information to a mobile handheld device from a database system according to an embodiment. In particular, FIG. 2 illustrates an arrangement of components configured to implement the method 100 of FIG. 1, which also can be carried out in environments other than that illustrated in FIG. 2. In an embodiment, the database system may be implemented as a multi-tenant database system. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Illustrated in FIG. 2 is an information management service module 202 including components adapted for operating in an execution environment provided by a node 201 and/or multiple nodes as in a distributed execution environment. Exemplary nodes can include desktop computers, servers, networking nodes, notebook computers, PDAs, mobile phones, digital image capture devices, and the like. One example of such a node 201 will be described later in greater detail during reference to later illustrated embodiments. The information management service module 202 can include a data store 208 for storing information and other data objects. In an embodiment, the information management service module 202 can be configured to receive and send information from and to a mobile user system 210, e.g., a mobile handheld device, via a network 214. The network 214 may be a Local Area Network (LAN) and/or a Wide Area Network (WAN) including the Internet. The mobile user system 210 may include an application that allows network communication between the mobile user system 210 and the information management service module 202. Such an application can be, in an embodiment, a mobile browser 212 (e.g., Android browser, Safari, etc.) or the like that is capable of sending and receiving information to and from the node 201 hosting the information management service module 202.

FIG. 1, as stated above, illustrates a method for providing information to a mobile handheld device from a database system according to an embodiment. In this case, the method 100 can be implemented in the context of the node 201 hosting the information management service module 202, but can also be implemented in any desired environment. With reference to FIG. 1, the method begins, in block 102, by receiving a request for data from a network enabled mobile handheld device 210 having intermittent network connectivity by the node 201 hosting the information management service module 202. According to an embodiment, the information management service module 202 includes means for receiving the request for data from the network enabled mobile handheld device 210. For example, FIG. 2 illustrates a request handler component 204 configured for receiving the request for data from the network enabled mobile handheld device 210.

In an embodiment, the request handler component 204 can be configured to receive the request for data from the mobile handheld device 210 via the network 214. The network 214 can support any protocol compatible with a configuration of the information management service module 202 and/or other components hosted by the node 201 including the information management service module 202. The request for data can include a variety of information. For example, the request can include, but is not limited to, a search query for a report, information identifying or describing the requested data, information identifying a user requesting the data, and information identifying the mobile handheld device 210 and its available storage capacity.

Referring again to FIG. 1, when the request is received, unrequested anticipated data is identified based on a data request pattern associated with the requested data (block 104). According to an embodiment, the request handler component 204 can be configured for identifying the unrequested anticipated data based on the requested data by using a data request pattern 203 associated with the requested data 207.

In an embodiment, a request monitoring component 205 hosted by the node 201 and optionally integrated with the request handler component 204, can be configured for creating the data request pattern 203 associated with the requested data 207 by monitoring a plurality of subsequent data requests associated with the requested data. For example, the requested data 207 can be a corporate report that summarizes annual earnings over 10 years. When the corporate report is requested and retrieved, the request monitoring component 205 can be configured to monitor subsequent data requests associated with the initial request for the corporate report. In an embodiment, the request monitoring component 205 can be configured to track subsequent data requests from any requester during a single communication session or over several communication sessions during a predetermined period of time.

According to an embodiment, the request monitoring component 205 can be configured for analyzing the plurality of subsequent data requests to determine a data request pattern 203, where the data request pattern 203 ranks follow up data requests based on a ranking criteria, such as a subsequent request frequency. For example, referring again to the requested corporate report, the request monitoring component 205 can determine, based on the subsequent data requests, that an annual earnings report for year nine (9) within the 10 year span is most frequently requested as a follow up data request, and that the annual earnings report for year one (1) is the next most frequently requested report. In this example, the data request pattern 203 can include the annual reports for year nine (9) and one (1), where year nine (9) is ranked first and year one (1) is ranked second. Alternatively or in addition, the ranking criteria can be based on when the data was requested, e.g., the most recently requested data is ranked highest.

In another embodiment, the request monitoring component 205 can be configured for creating a user specific data request pattern 203a associated with a particular user and with the requested data 207. In this embodiment, the request monitoring component 205 can be configured for monitoring a plurality of a user's subsequent data requests associated with the requested data, and for analyzing the plurality of the user's subsequent data requests to determine the user specific data request pattern 203a.

Alternatively or in addition, in another embodiment, the data request pattern 203 associated with the requested data 207 can be based on links embedded in the requested data 207. For example, referring again to the requested corporate report, the report can include links to each of the annual earnings reports for years one (1) through ten (10), and the request monitoring component 205 can be configured to identify those links. In this example, the data request pattern 203 can include all of the links embedded in the requested data 207, i.e., links to each of the annual reports, and optionally can rank them according to the ranking criteria, e.g., most recently requested, request frequency and/or any combination thereof.

Once the data request pattern 203 and/or the user specific data request pattern 203a is determined, the request monitoring component 205 can be configured for generating an association between the data request pattern 203, 203a and the requested data 207. The user specific data request pattern 203a can be further associated with the user such that the association is between the user, the user specific request pattern 203a, and the requested data 207. The association is then stored in the database system 208. According to an exemplary embodiment, a data manager component 206 hosted by the node 201 and optionally integrated with the information management service module 202 can be configured to receive the association from the request handler component 204, and optionally to process the association so that it can be stored in the database system 208.

According to an embodiment, the request handler component 204 can be configured for identifying the unrequested anticipated data 209 by retrieving the data request pattern 203 based on the association between the data request pattern 203 and the requested data 207. In an embodiment, the request handler component 204 can invoke the data manager component 206 to retrieve the data request pattern 203. The request handler component 204 can then select at least one of the follow up data requests in the data request pattern 203. In an embodiment, the highest ranking follow up data request can be selected automatically. Alternatively or in addition, the selected follow up data request(s) can be based on ranking and on other criteria, such as size, type, and format.

Referring again to FIG. 1, once the anticipated data 209 is identified, the requested data 207 and the anticipated data 209 are retrieved from the database system 208 (block 106). According to an embodiment, the request handler component 204 can invoke the data manager component 206 for performing this task. For example, the data manager component 206 can be configured to receive from the request handler component 204 a GET command including an identifier associated with the requested data 207 and at least one identifier associated with the anticipated data 209. The data manager component 206 can then be configured to process the command against the database 208, and to retrieve and return the requested data 207 and the anticipated data 209.

Referring again to FIG. 1, the requested data 207 and at least a portion of the anticipated data 209 is sent to the network enabled mobile handheld device 210 via the network 214 (block 108). According to an embodiment, by providing anticipated data 209 along with requested data 207, a mobile user has direct access to the unrequested anticipated data 209 when network connectivity is interrupted.

In an exemplary embodiment, when the request handler component 204 receives the requested data 207 and the anticipated data 209, it is configured for determining how much of the anticipated data 209 should be sent to the mobile handheld device 210. For example, the request handler component 204 can determine an available storage of the network enabled handheld mobile device 210 based on the information received in the request for data. As noted above, the request for data can include information identifying or describing the requested data, information identifying a user requesting the data, and information identifying the mobile handheld device 210 and its available storage capacity.

According to an embodiment, the request handler component 204 can determine a total storage requirement by summing a storage requirement of the requested data 207 and a storage requirement of the anticipated data 209. When the total storage requirement is less than the available storage of the network enabled mobile device 210, the requested data 207 and all of the anticipated data 209 can be sent to the device 210. Otherwise, when the total storage requirement exceeds the available storage of the network enabled mobile device 210, the requested data 207 and a portion of the anticipated data 209 can be sent to the device 210. In an embodiment, a sum of the storage requirements of the requested data and of the portion of the anticipated data is less than the available storage of the network enabled mobile device 210.

The information management service module 202 includes means for sending the requested data 207 and at least a portion of the anticipated data 209 to the network enabled mobile handheld device 210. For example, FIG. 2 illustrates a message handler component 211 configured for performing this task. In an embodiment, the message handler component 211 can generate a message including the requested data 207 and at least a portion of the anticipated data 209 and can send the message to the requesting mobile handheld device 210 as a response to the request for data.

Figure 3:
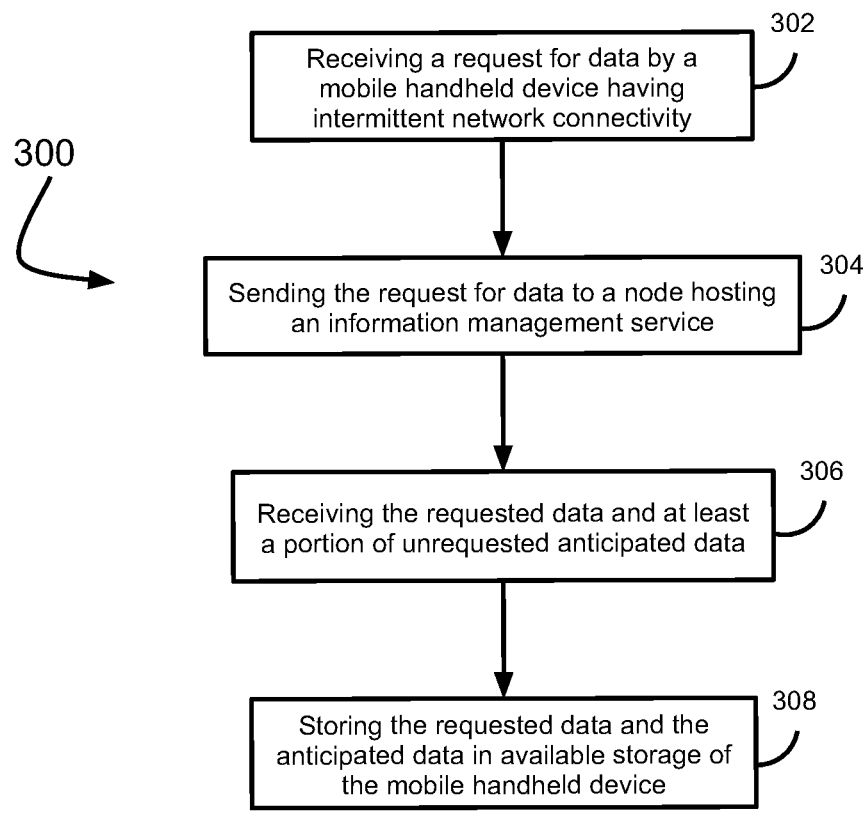
FIG. 3 is an operational flow diagram illustrating a high level overview of a technique for accessing information from a database system by a mobile handheld device having intermittent network connectivity according to another embodiment.

FIG. 3 illustrates a method for accessing information from a database system by a mobile handheld device having intermittent network connectivity according to another embodiment. Here, the method 300 can be implemented in the context of the mobile handheld device 210 of FIG. 2. The method 300 may, however, be carried out in any desired environment.

Referring to FIG. 2 and FIG. 3, a request for data is received in block 302. In an embodiment, the mobile handheld device 210 can include an information manager component 220 configured for receiving the request for data. The request can be received in a number of ways. For example, it can be received via manual input by a user using an input device such as a keyboard, via audio input, and/or via a scanning or imaging device. In an embodiment, a scanning device can be used to read a barcode or other information associated with the requested data. In another embodiment, an camera component (not shown) in the handheld device 210 can be used to capture an image of the information associated with the requested data.

Figure 4A:
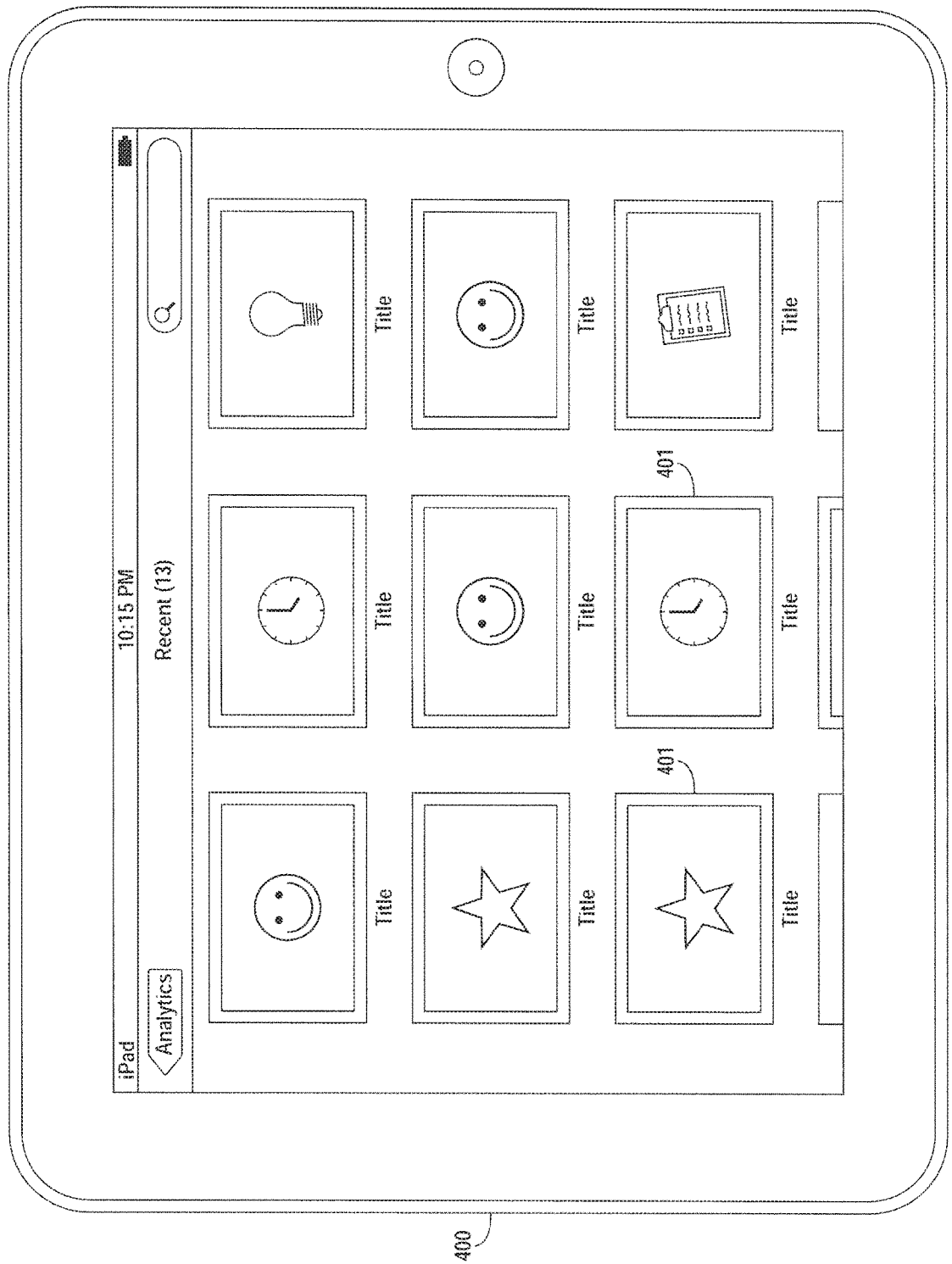
FIG. 4A illustrates a graphical user interface representing a report selector that may be displayed for receiving the request for data according to an exemplary embodiment.
Figure 4B:
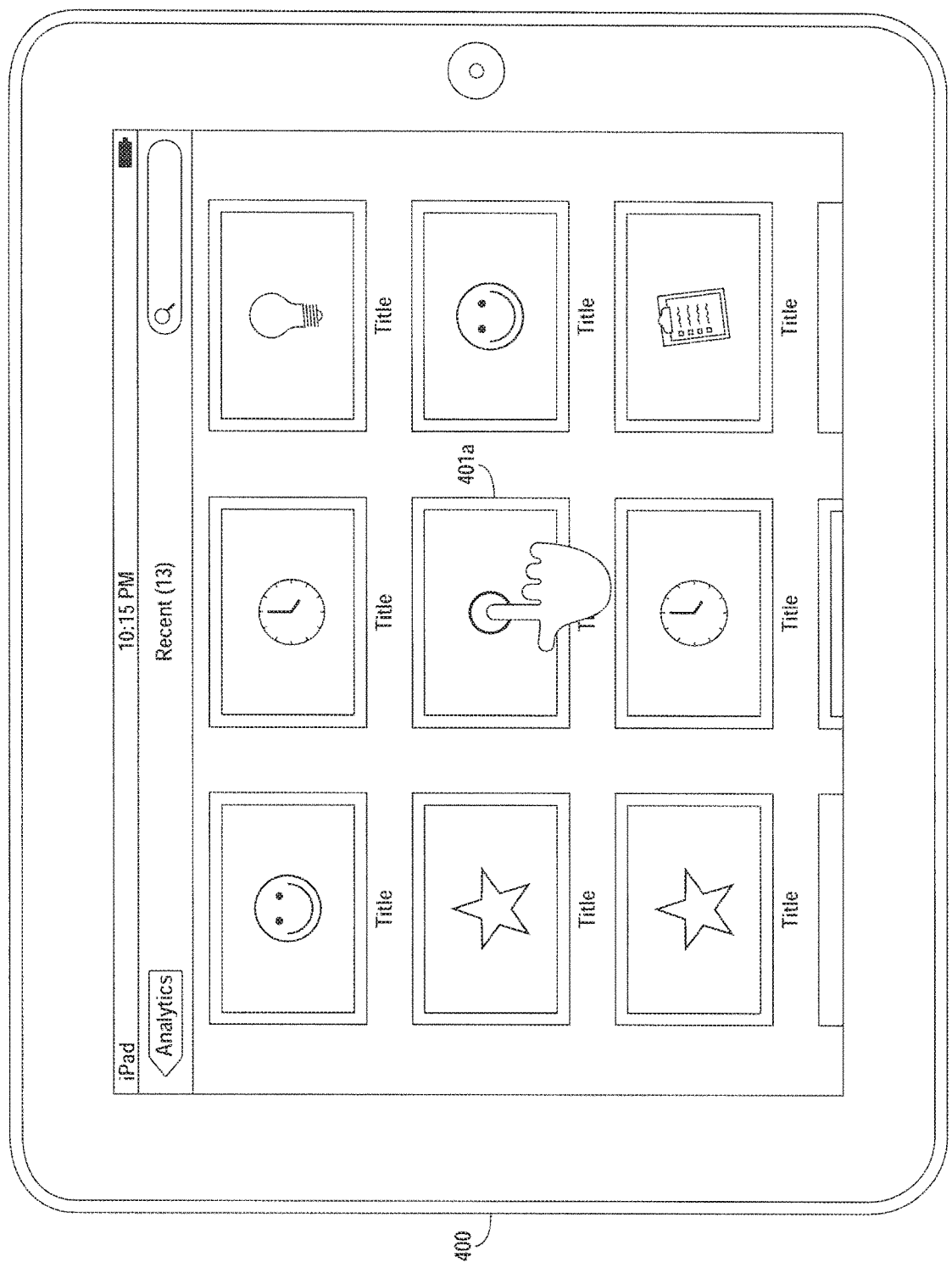
FIG. 4B illustrates a graphical user interface representing how an indication selecting an icon can be received according to an embodiment.

Alternatively or in addition, in an embodiment, the information manager component 220 can display a plurality of icons associated with files, records, and/or objects for the user and an indication selecting an icon associated with the requested data can be received. FIG. 4A illustrates a graphical user interface representing a report selector 400 that may be displayed for receiving the request for data according to an exemplary embodiment. In an embodiment, the report selector 400 can be provided by the information manager component 220 in the network browser 212. Alternatively or additionally, the report selector 400 can be provided by the information management service module 202. As shown, the report selector 400 includes a plurality of icons/thumbnails 401 associated with files, records, and/or objects. FIG. 4B illustrates how an indication selecting an icon 401a is received by the information manager component 220.

In another embodiment, the information manager component 220 can be configured for receiving at least one search criteria relating to the requested data. Based on the at least one search criteria, the information manager component 220 can generate a search query and can generate the request for data including the search query. In this embodiment, the information manager component 220 can be configured for processing the search query, and for displaying a report selector 400 including a plurality of icons/thumbnails corresponding to files, records, and/or objects that satisfy the search query. From the displayed report selector 400, the information manager component 220 can receive an indication selecting an icon, e.g., 401a, associated with the requested data.

As indicated above, the request for data can include various additional information in addition to a search query and/or information identifying or describing the requested data. For instance, the search query can include information identifying a user requesting the data, and information identifying the mobile handheld device 210 and its available storage capacity.

Referring again to FIG. 3, the request for data is sent to a node hosting an information management service module configured for retrieving the requested data and for retrieving unrequested anticipated data from a database system (block 304). In an embodiment, the information manager component 220 can invoke the network browser 212 to send the request for data to the information management service module, e.g., service module 202, hosted by the node 201 via the network 214. In response to sending the request for data, the information manager component 220 can be configured for receiving the requested data 207 and at least a portion of unrequested anticipated data 209 (block 306), and for storing the requested data 207 and the at least a portion of anticipated data 209 in available storage 230 of the mobile handheld device 210 (block 308).

In an embodiment, the storage 230 can be a temporary storage component, e.g., a cache, or a persistent storage component. In another embodiment, the data 207, 209 can be stored in a combination of persistent and temporary storage. Because anticipated data 209 along with requested data 207 is stored, a user of the mobile handheld device 210 has direct access to unrequested anticipated data 209 when network connectivity is interrupted.

Figure 5A:
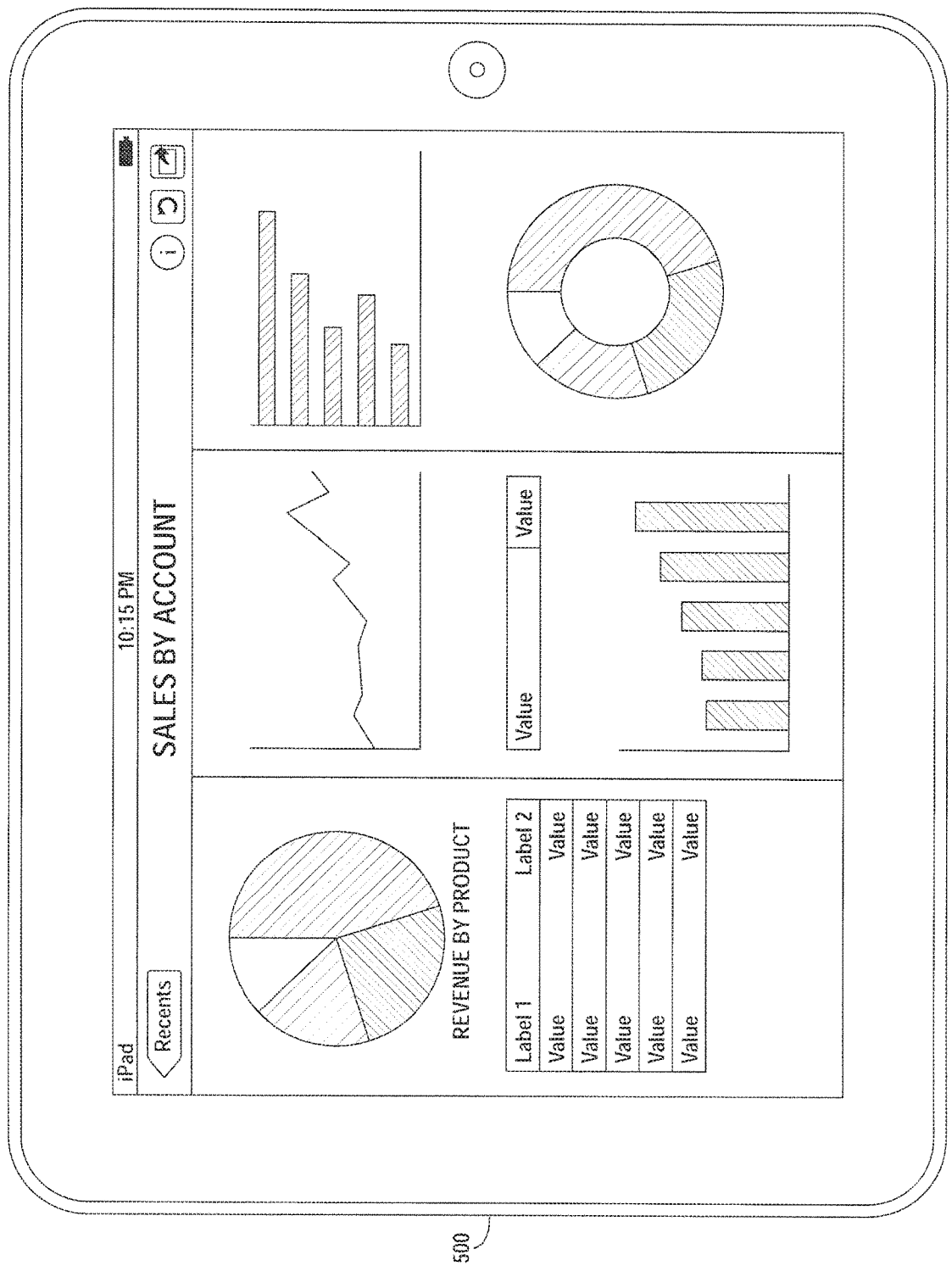
FIG. 5A illustrates a graphical user interface representing a report corresponding to requested data, which has been rendered and displayed according to an exemplary embodiment.

For example, when the requested data 207 is stored by the information manager component 220 in storage 230, the requested data 207 can be retrieved by a rendering engine component 213 hosted by the handheld device 210. The rendering engine component 213 can be configured for rendering the requested data 207, e.g., a report, and for providing the rendered report to the network browser 212 for display to the user. FIG. 5A illustrates a graphical user interface representing a report 500 corresponding to requested data, which has been rendered and displayed. According to an embodiment, the report 500 can include a link to a related report. For example, FIG. 5B illustrates that the report 500 includes a link 502 located on or near a "Revenue by Product" piechart corresponding to a "Revenue by Product" report.

Figure 5B:
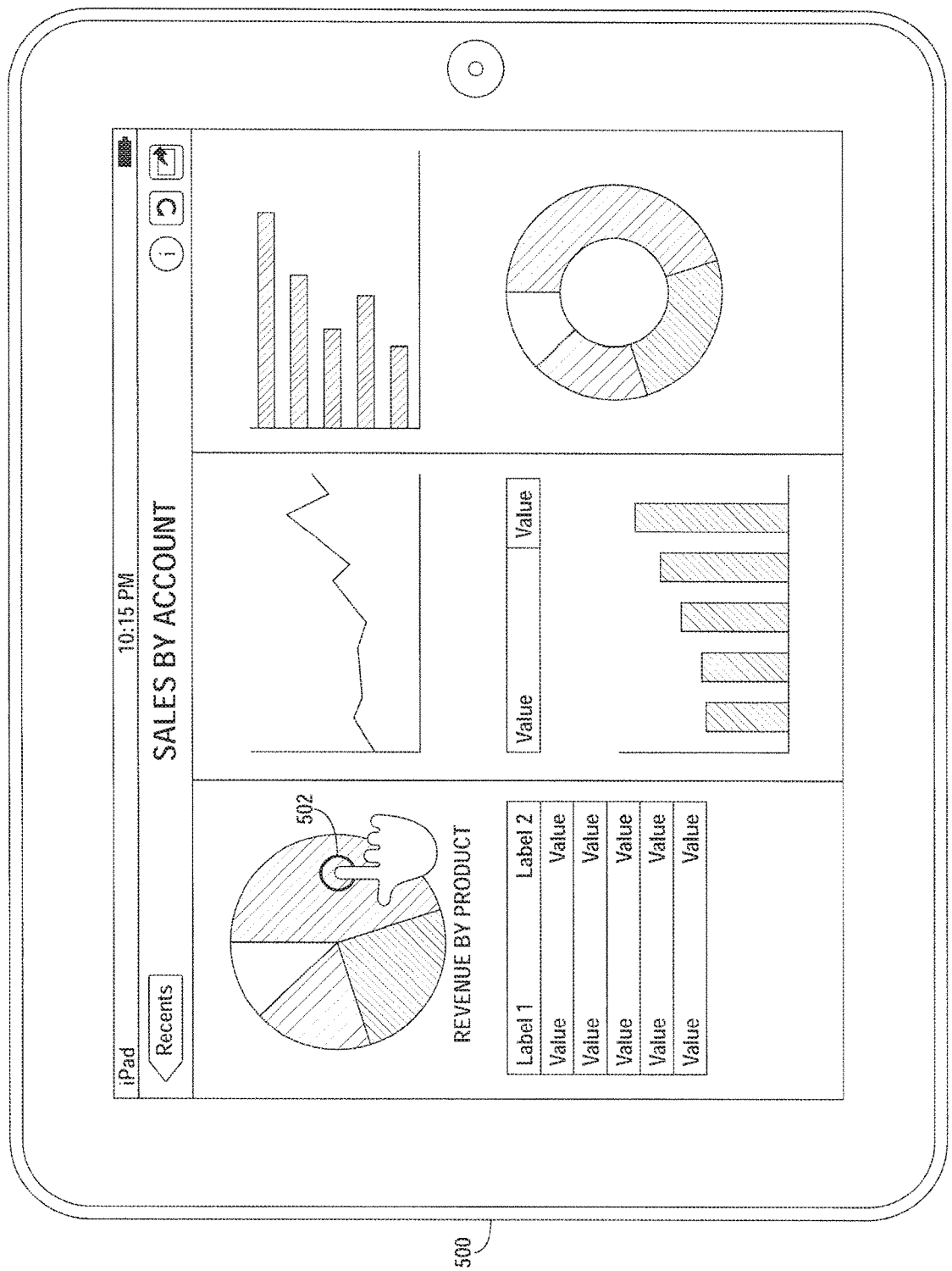
FIG. 5B illustrates a graphical user interface that shows a link in the report of FIG. 5A according to an exemplary embodiment.
Figure 5C:
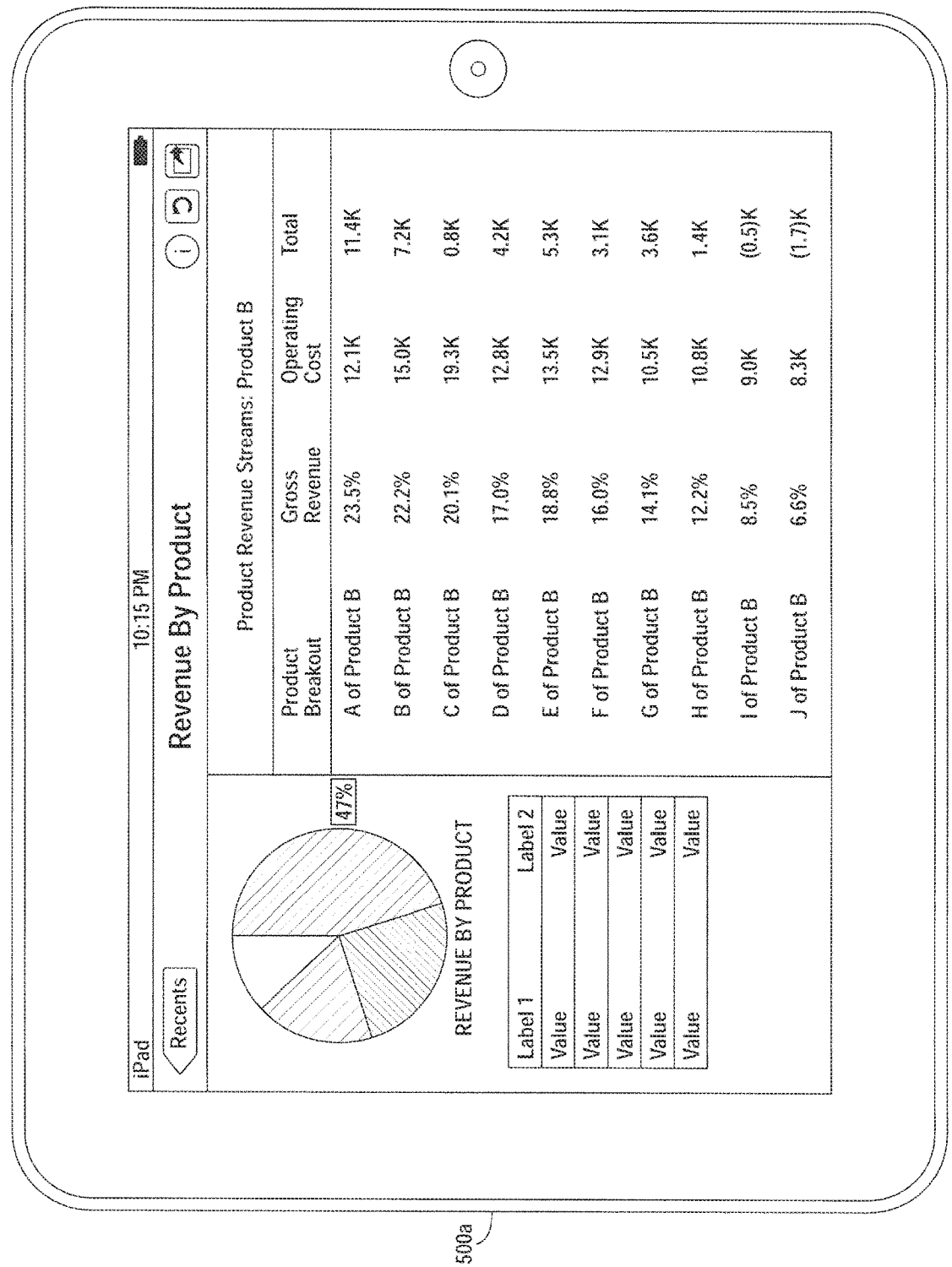
FIG. 5C illustrates a graphical user interface representing a report that may be displayed in response to receiving an indication selecting the link of FIG. 5B according to an exemplary embodiment.

When the user selects the link 502, as shown in FIG. 5B, the information manager component 220 can be configured for receiving the indication selecting the link 502 to the related report, e.g., a Revenue by Product report, and for determining that the related report corresponds to anticipated data 209 stored in the available storage 230 of the mobile handheld device 210. In an embodiment, the information manager component 220 can be configured for invoking the rendering engine component 213 to retrieve the anticipated data 209 corresponding to the related report, and to render the related report from the anticipated data 209. The rendered Revenue by Product report 500a is then displayed to the user, as shown in FIG. 5C. Because the anticipated data 209 corresponding to the Revenue by Product report 500a is provided along with the requested data 207 corresponding to the Sales by Account report 500, the user has direct access to the related report even when network connectivity is interrupted.

According to another embodiment, the information management service module 202 can provide an alert to the mobile handheld device 210 when the requested data 207 and/or the anticipated data 209 is updated. For example, when an update is performed by the database system 208, the request handler component 204 can be configured for receiving an indication updating the requested data 207 and/or the anticipated data 209. In response to receiving this indication, a notification can be sent to the network enabled mobile handheld device 210 via the network 214. In an embodiment, the notification can include the updated requested data 207 and/or the updated anticipated data 209.

The information manager component 220 can be configured for receiving the notification and for storing the updated requested data and/or the updated anticipated data in the available storage 230 of the mobile handheld device 210. In an embodiment, when the notification is received, the information manager component 220 can notify the user that an update has been received by, for example, causing the device 210 to vibrate or by activating a ring tone. In another embodiment, the user can review any received updates by, for example, shaking the handheld device 210 or selecting an update button on the graphical user interface displaying a report.

System Overview

Figure 6:
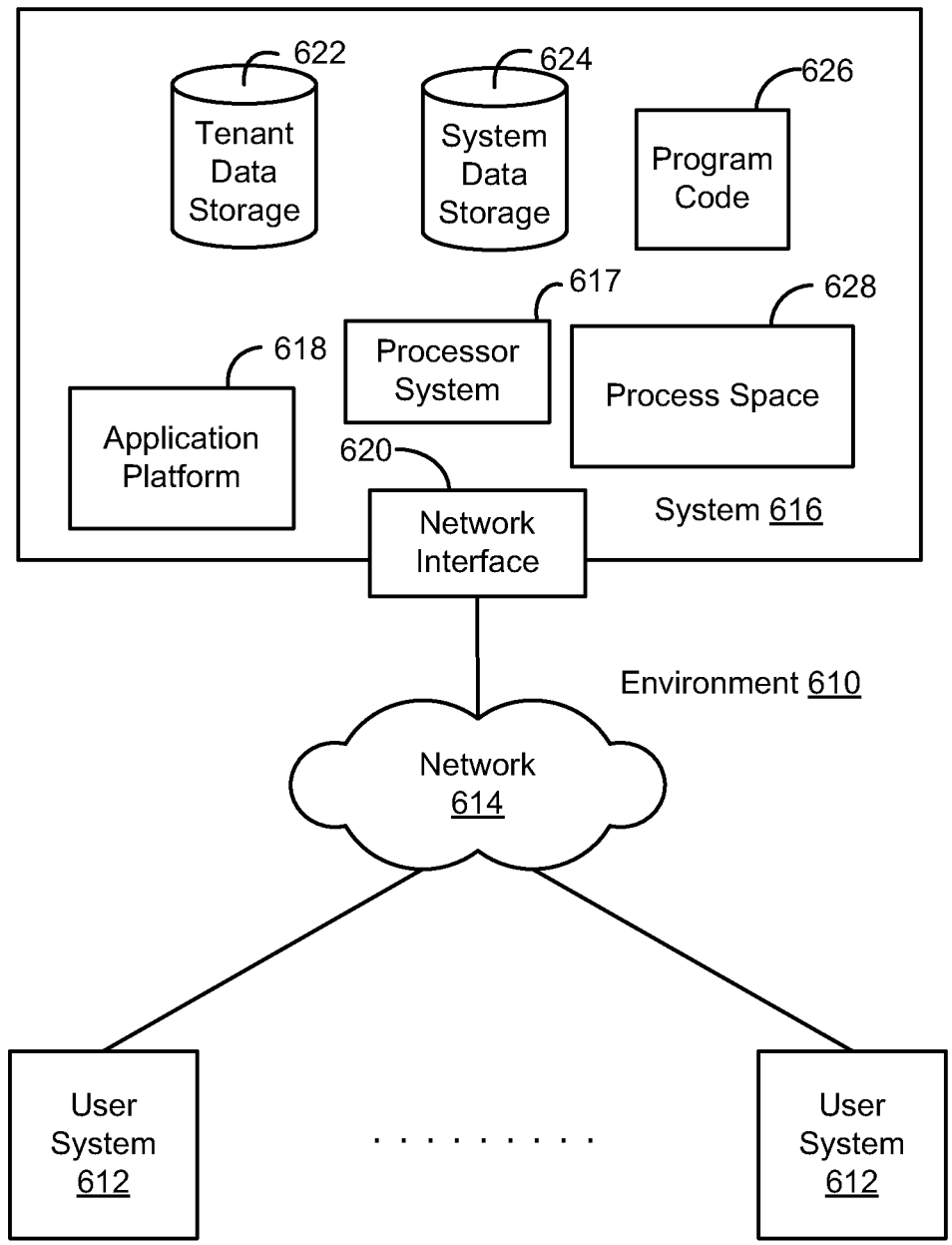
FIG. 6 illustrates a block diagram of an example of an environment wherein an on-demand database service might be used.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
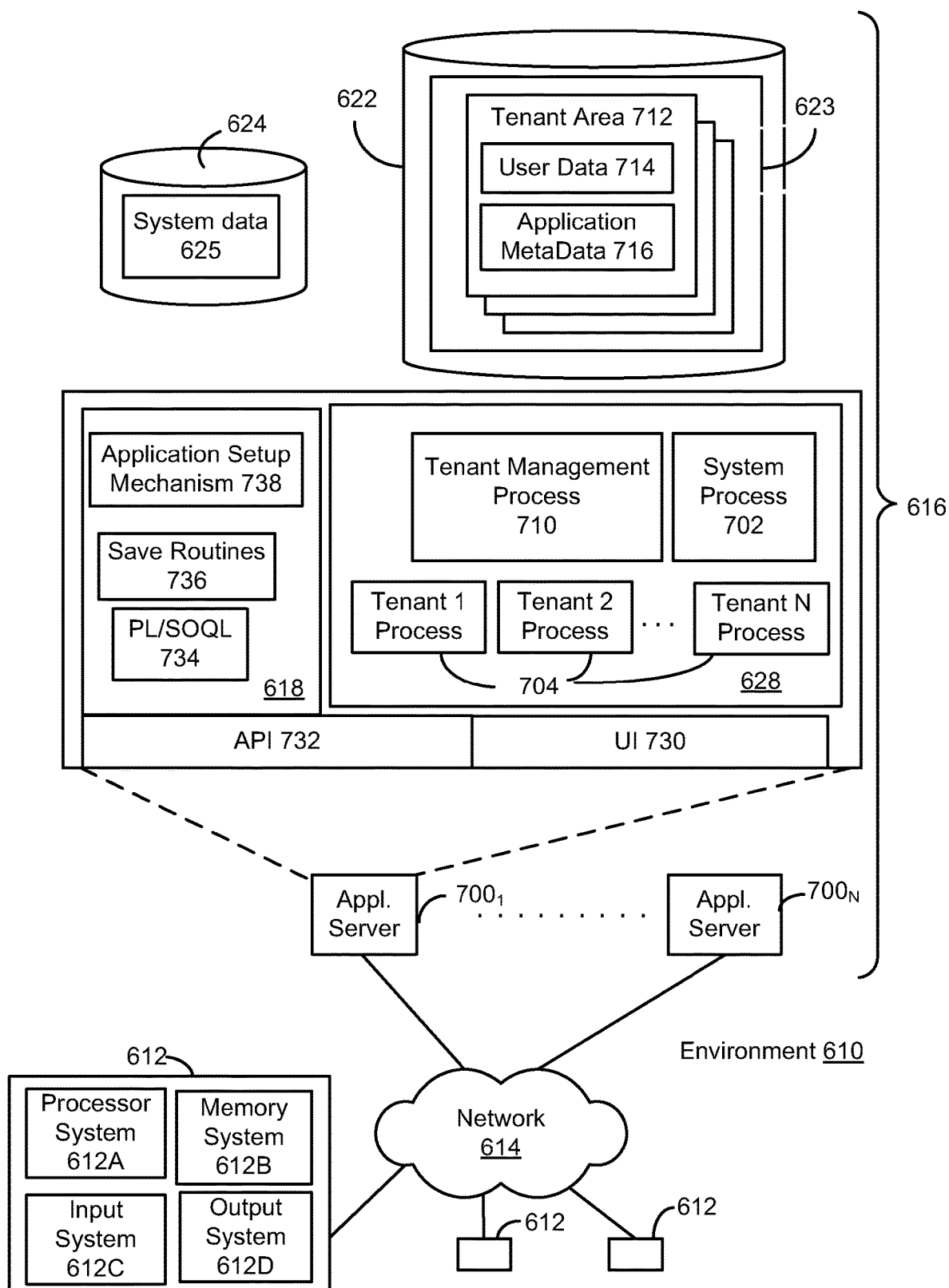
FIG. 7 illustrates a block diagram of an embodiment of elements of FIG. 6 and various possible interconnections between these elements.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user data storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 7001-700N, an application platform 618, tenant data storage 622, and system data storage 624. Also shown is system process space 702, including individual tenant process spaces 704 and a tenant management process space 710. Each application server 7001-700N may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user data storage 714 and application metadata 716 might be similarly allocated for each user. For example, a copy of a user's most recently used (MRU) items might be stored to user data storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data 623 and the system data 625 may be stored in various databases, such as one or more ORACLE® databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 716 for the subscriber making the invocation and executing the metadata as an application in a virtual machine.

Each application server $700_1$-$700_N$ may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers $700_1$-$700_N$ and the database system. However, it will be apparent to one skilled in the art that other transport protocols may be used to optimize the system depending on the network interconnect used.

In certain embodiments, each application server $700_1$-$700_N$ is configured to handle requests for any user associated with any organization that is a tenant. Because it is desirable to be able to add and remove application servers from the server pool at any time for any reason, there is preferably no server affinity for a user and/or organization to a specific application server $700_1$-$700_N$. In one embodiment, therefore, an interface system implementing a load balancing function (e.g., an F5 Big-IP load balancer) is communicably coupled between the application servers $700_1$-$700_N$ and the user systems 612 to distribute requests to the application servers $700_1$-$700_N$. In one embodiment, the load balancer uses a least connections algorithm to route user requests to the application servers $700_1$-$700_N$. Other examples of load balancing algorithms, such as round robin and observed response time, also can be used. For example, in certain embodiments, three consecutive requests from the same user could hit three different application servers $700_1$-$700_N$, and three requests from different users could hit the same application server $700_1$-$700_N$. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers $700_1$-$700_N$ to request and update system-level and tenant-level data from system 616 that may require sending one or more queries to tenant data storage 622 and/or system data storage 624. System 616 (e.g., an application server $700_1$ in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for providing information to a mobile handheld device from a database system, the method comprising:
receiving, by a node hosting an information management service, a request for data, the request received from a network enabled mobile handheld device, wherein the mobile handheld device has intermittent network connectivity;
identifying, by the information management service, unrequested anticipated data based on the requested data associated with the received request by using a pattern of previous data requests associated with the requested data, at least one of the previous data requests being for the unrequested anticipated data, the unrequested anticipated data being data that is anticipated to be requested when the network connectivity is interrupted;
retrieving, by the information management service, the requested data and the unrequested anticipated data from a database system;
sending, by the information management service, to the network enabled mobile handheld device via a network based upon a determination of an available storage of the network enabled mobile device and a total storage requirement for the requested and unrequested anticipated data: i) the requested data and the unrequested anticipated data when the total storage requirement is less than the available storage, and ii) the requested data with at least a portion of the unrequested anticipated data when the total storage requirement exceeds the available storage so that a mobile user has direct access to the unrequested anticipated data when the network connectivity is interrupted.

2. The method of claim 1 wherein receiving the request for data comprises receiving the request over a network, wherein the network is at least one of a public and a private network, and wherein the database system is a multi-tenant on-demand database system.

3. The method of claim 1 further comprising:
monitoring, by a request monitoring component hosted by the node, the plurality of subsequent data requests associated with the requested data;
analyzing, by the request monitoring component, the plurality of subsequent data requests to determine a data request pattern, wherein the data request pattern ranks follow up data requests based on a ranking criteria;
generating an association, by the request monitoring component, between the data request pattern and the requested data; and
storing the association between the data request pattern and the requested data in the database system.

4. The method of claim 3 wherein identifying the unrequested anticipated data comprises retrieving the data request pattern based on the association between the data request pattern and the requested data, and selecting at least one of the follow up data requests in the data request pattern.

5. The method of claim 1 further comprising:
monitoring, by a request monitoring component hosted by the node, a plurality of a user's subsequent data requests associated with the requested data;
analyzing, by the request monitoring component, the plurality of the user's subsequent data requests to determine a user specific data request pattern, wherein the user specific data request pattern ranks subsequent data requests based on the user's request history;
generating an association, by the request monitoring component, between the user, the user specific data request pattern, and the requested data; and
storing the association between the user, the user specific data request pattern, and the requested data in the database system.

6. The method of claim 1 further comprising:
receiving, by the information management service, an indication updating at least one of the requested data and the unrequested anticipated data; and
sending, by the information management service, a notification including at least one of the updated requested data and the updated unrequested anticipated data to the network enabled mobile handheld device via the network.

7. A non-transitory machine-readable medium carrying one or more sequences of instructions for providing information to a mobile handheld device from a database system, which instructions, when executed by one or more processors, cause the one or more processors to:
receive, by an information management service, a request for data, the request received from a network enabled mobile handheld device, wherein the mobile handheld device has intermittent network connectivity;
identify, by the information management service, unrequested anticipated data using a pattern of previous data requests associated with the requested data, at least one of the previous data requests being for the unrequested anticipated data, the unrequested anticipated data being data that is anticipated to be requested when the network connectivity is interrupted;
retrieve, by the information management service, the requested data and the unrequested anticipated data from a database system; and
send, by the information management service, to the network enabled mobile handheld device via a network based upon a determination of an available storage of the network enabled mobile device and a total storage requirement for the requested and unrequested anticipated data: i) the requested data and the unrequested anticipated data when the total storage requirement is less than the available storage, and ii) the requested data with at least a portion of the unrequested anticipated data when the total storage requirement exceeds the available storage so that a mobile user has direct access to the unrequested anticipated data when the network connectivity is interrupted.

8. An apparatus for providing information to a mobile handheld device from a database system, the apparatus comprising:
a processor; and
one or more stored sequences of instructions which, when executed by the processor, cause the processor to:
receive, by an information management service, a request for data, the request received from a network enabled mobile handheld device, wherein the mobile handheld device has intermittent network connectivity;
identify, by the information management service, unrequested anticipated data based on the requested data associated with the received request by using a data request pattern associated with the requested data, the unrequested anticipated data being data that is anticipated to be requested when network connectivity is interrupted;
retrieve, by the information management service, the requested data and the unrequested anticipated data from a database system; and
send, by the information management service, to the network enabled mobile handheld device via a network based upon a determination of an available storage of the network enabled mobile device and a total storage requirement for the requested and unrequested anticipated data: i) the requested data and the unrequested anticipated data when the total storage requirement is less than the available storage, and ii) the requested data with at least a portion of the unrequested anticipated data when the total storage requirement exceeds the available storage so that a mobile user has direct access to the unrequested anticipated data when the network connectivity is interrupted.

9. A method for transmitting code for providing information to a mobile handheld device from a database system on a transmission medium, the method comprising:
transmitting code to receive, by an information management service, a request for data, the request received from a network enabled mobile handheld device, wherein the mobile handheld device has intermittent network connectivity;
transmitting code to identify, by the information management service, unrequested anticipated data using a pattern of previous data requests associated with the requested data, at least one of the previous data requests being for the unrequested anticipated data, the unrequested anticipated data being data that is anticipated to be requested when the network connectivity is interrupted;

transmitting code to retrieve, by the information management service, the requested data and the unrequested anticipated data from a database system; and transmitting code to send, by the information management service to the network enabled mobile handheld device via a network based upon a determination of an available storage of the network enabled mobile device and a total storage requirement for the requested and unrequested anticipated data: i) the requested data and the unrequested anticipated data when the total storage requirement is less than the available storage, and ii) the requested data with at least a portion of the unrequested anticipated data when the total storage requirement exceeds the available storage so that a mobile user has direct access to the unrequested anticipated data when the network connectivity is interrupted.

* * * * *